United States Patent
Boczarski et al.

(10) Patent No.: US 8,448,134 B1
(45) Date of Patent: May 21, 2013

(54) SYSTEMS AND METHODS FOR RELIABLY IDENTIFYING CONTROLS INVOKED DURING QUALITY-ASSURANCE REVIEWS OF USER INTERFACES

(75) Inventors: Rafal Boczarski, Warsaw (PL); Piotr Dudnik, Warsaw (PL); Sebastian Gruchacz, Zabki (PL)

(73) Assignee: Symantec Corporation, Mountain View, CA (US)

( * ) Notice: Subject to any disclaimer, the term of this patent is extended or adjusted under 35 U.S.C. 154(b) by 932 days.

(21) Appl. No.: 12/546,007

(22) Filed: Aug. 24, 2009

(51) Int. Cl.
*G06F 9/44* (2006.01)

(52) U.S. Cl.
USPC .......................... 717/113; 717/105; 717/125

(58) Field of Classification Search
USPC ................... 717/101–113, 120–128
See application file for complete search history.

(56) References Cited

U.S. PATENT DOCUMENTS 7,979,358 B1 * 7/2011 Clem et al. .................... 705/300
2006/0100975 A1 * 5/2006 McMaster et al. ............. 707/1

OTHER PUBLICATIONS

SAP AG, "D2.1 XML Languages for User Interface Models", Sep. 2008, SAP AG, pp. 1-48.*

* cited by examiner

*Primary Examiner* — Ted T Vo

(74) *Attorney, Agent, or Firm* — ALG Intellectual Property, LLC

(57) ABSTRACT

A computer-implemented method for reliably identifying controls invoked during quality-assurance reviews of user interfaces may include: 1) identifying at least one user-interface control invoked during an initial quality-assurance review of a user interface, 2) for each identified user-interface control, identifying an object-tree path that is followed when invoking the user-interface control, 3) storing the object-tree path for the user-interface control in a data structure, and then 4) using the object-tree path during a subsequent quality-assurance review to automatically identify and invoke the user-interface control.

19 Claims, 8 Drawing Sheets

SYSTEMS AND METHODS FOR RELIABLY IDENTIFYING CONTROLS INVOKED DURING QUALITY-ASSURANCE REVIEWS OF USER INTERFACES

BACKGROUND

In order to be successful, software development companies strive to produce high-quality and error-free software. Because the user interface of a software application is typically the most visible aspect of a software application, software development companies may devote significant resources to performing thorough quality-assurance reviews of their user interfaces.

A thorough quality-assurance review of a software application's user interface may be expensive, requiring many man-hours to review each aspect of the user interface in its various states. In order to increase both the efficiency and thoroughness of such quality-assurance reviews, some software development companies may use automation tools to automatically record the actions (such as mouse clicks and key presses) of a quality-assurance engineer as he/she interacts with and guides a user interface through its various states. The automation tool may then play back these recorded actions on different versions or builds (such as operating-system-specific or language-specific versions or builds) of the user interface to test for display glitches, errors, or other defects in the user interface.

Unfortunately, many conventional automation tools fail to reliably identify the user-interface controls (such as command buttons, selection boxes, menus, and the like) that are the target of the quality-assurance engineer's actions. For example, because the size and orientation of, and class names, styles, and text captions for, user-interface controls may vary across the various builds and versions of a user interface, or across the technologies (such as HTML, JAVA, and WIN32) used to create such user interfaces, conventional automation tools may fail to correctly identify or recreate various user-interface controls during automated recording or playback operations. As such, the instant disclosure identifies a need for reliably identifying controls invoked during quality-assurance reviews of user interfaces.

SUMMARY

As will be described in greater detail below, the instant disclosure generally relates to systems and methods for reliably identifying controls invoked during quality-assurance reviews of user interfaces. In one example, an exemplary computer-implemented method for performing such a task may include: 1) identifying at least one user-interface control invoked during an initial quality-assurance review of a user interface (such as a quality-assurance engineer's review of an initial build or version of a user interface), 2) for each identified user-interface control, identifying an object-tree path that is followed when invoking the user-interface control in the user interface, 3) storing this object-tree path in a data structure (such as an XML or other database file), and then 4) using the object-tree path during a subsequent quality-assurance review (such as an automated review of a subsequent build or version of the user interface) to automatically identify and invoke the user-interface control.

In some examples, this exemplary method may also include identifying at least one property associated with the invoked user-interface control. Examples of such properties may include, without limitation, a handle associated with the control, a class associated with the control, a style associated with the control, a text caption associated with the control, a control identifier assigned to the control, X/Y coordinates for an object associated with the control, the width and height of an object associated with the control, and/or any other property that may be used to identify the control. The method may also include identifying the process or main window from which the identified user-interface control originates. In one example, all or a portion of this information may be stored in the data structure.

In some embodiments, this exemplary method may also include, upon identifying an object-tree path that is followed when invoking the user-interface control, adding missing elements to, and/or removing unnecessary elements from, this object-tree path. In some examples, the method may also include determining whether the identified object-tree path correctly invokes the user-interface control in order to verify that the object-tree path is accurate.

In one example, the various systems disclosed herein may use these object-tree paths to automatically invoke user-interface controls during subsequent quality-assurance reviews (such as automated reviews of subsequent builds or versions of a user interface) by: 1) retrieving information that identifies an object-tree path for a user-interface control from a database and then 2) following this object-tree path on the subsequent version or build of the user interface to invoke the user-interface control.

In some examples, the method may also include, prior to attempting to invoke a user-interface control during a subsequent quality-assurance review: 1) retrieving information from the data structure that identifies the process or main window associated with the user-interface control and then 2) instantiating or activating this process or main window. The method may also include: 1) identifying at least one property (such as the handle, class, style, etc.) of the user-interface control to be invoked by the object-tree path during the subsequent quality-assurance review and then 2) determining whether these properties match properties associated with the user-interface control that were identified during the initial quality-assurance review.

As detailed above, the systems and methods disclosed herein may also be used to automatically and reliably invoke controls during automated quality-assurance reviews of different versions and builds of a user interface. In one example, an exemplary method for performing such a task may include: 1) identifying an object-tree path that was followed when a user-interface control was invoked during a prior quality-assurance review (such as a quality-assurance engineer's review of an initial build or version of a user interface), 2) retrieving the object-tree path associated with the user-interface control from a data structure, and then 3) using the object-tree path to automatically invoke the user-interface control during a subsequent quality-assurance review (such as an automated review of a subsequent build or version of the user interface).

As will be explained in detail below, by creating an object-path tree for each user-interface control that is invoked during a quality-assurance review of a user interface, the systems and methods disclosed herein may be able to automatically, efficiently, and reliably identify and record each user-interface control that is invoked by a quality-assurance engineer during his/her initial review of the user interface. This object-tree path may then be used to reliably and automatically invoke user-interface controls during subsequent quality-assurance reviews of the user interface in order to quickly and efficiently test different versions and builds of the interface.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
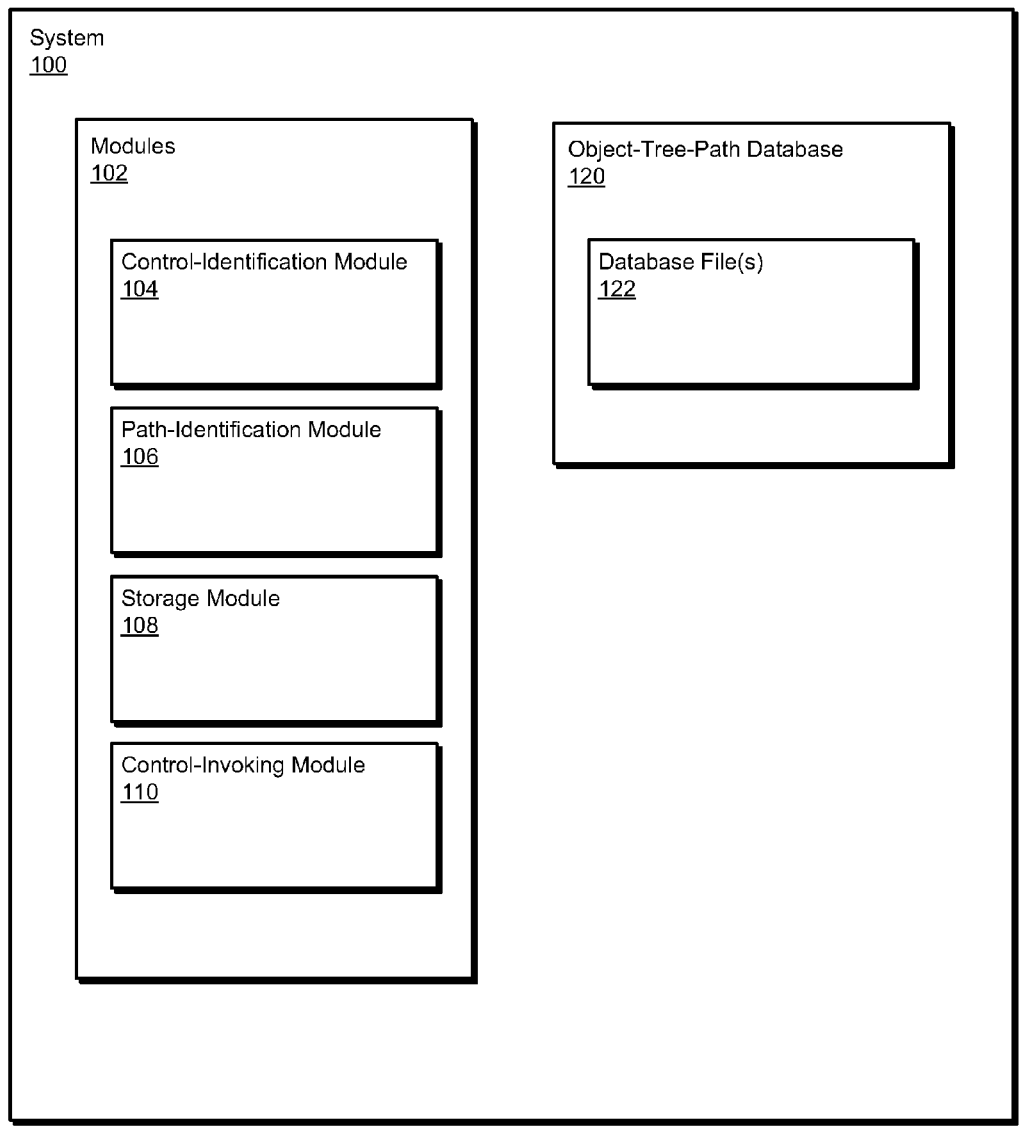
FIG. 1 is a block diagram of an exemplary system for reliably identifying controls invoked during quality-assurance reviews of user interfaces.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

As will be described in greater detail below, the instant disclosure generally relates to systems and methods for reliably identifying controls invoked during quality-assurance reviews of user interfaces. As used herein, the phrase "user-interface control," or sometimes simply "control," may refer to an element of graphical user interface that handles user input. Examples of user-interface controls include, without limitation, buttons (such as command, selection, and option buttons), boxes (such as selection, list, and text boxes), menus, bars, and/or any other element of a graphical-user interface that, when selected by a user (using, e.g., an input device such as a mouse, keyboard, or the like), may enable the user to control various aspects of a computing system.

Similarly, the term "user interface" (sometimes simply "interface"), as used herein, may refer to the aggregate means by which users interact with computing systems. The various user interfaces described herein may represent graphical user interfaces, text-based user interfaces, or any other means by which a user may provide input or receive output from a computing system. In addition, the exemplary user interfaces described herein may be created from or based on a variety of technologies, such as, for example, HTML, JAVA, WIN32, and the like.

Figure 2:
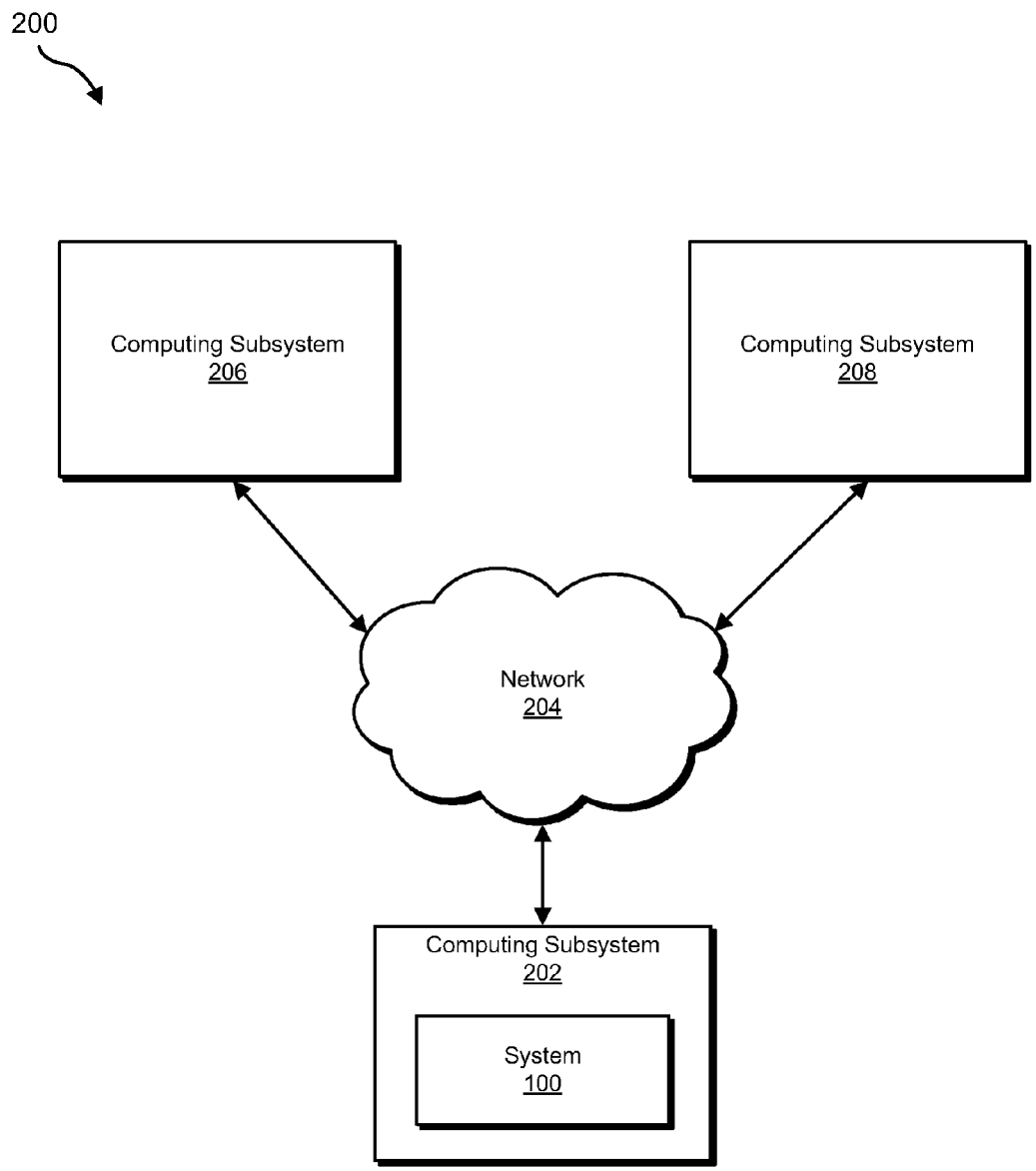
FIG. 2 is a block diagram of an exemplary system for reliably identifying controls invoked during quality-assurance reviews of user interfaces.

The following will provide, with reference to FIGS. 1-2, detailed descriptions of exemplary systems for reliably identifying controls invoked during quality-assurance reviews of user interfaces. Detailed descriptions of corresponding computer-implemented methods will also be provided in connection with FIGS. 3-6. In addition, detailed descriptions of an exemplary computing system and network architecture capable of implementing one or more of the embodiments described herein will be provided in connection with FIGS. 7 and 8, respectively.

FIG. 1 is a block diagram of an exemplary system 100 for reliably identifying controls invoked during quality-assurance reviews of user interfaces, As illustrated in this figure, exemplary system 100 may include one or more modules 102 for performing one or more tasks. For example, and as will be explained in greater detail below, exemplary system 100 may include a control-identification module 104 programmed to identify user-interface controls invoked during an initial quality-assurance review of a user interface. As will be explained in greater detail below, exemplary system 100 may also include a path-identification module 106 programmed to identify, for each user-interface control identified by control-identification module 104, an object-tree path that is followed when invoking the user-interface control.

In addition, exemplary system 100 may include a storage module 108 programmed to store object-tree paths for user-interface controls in a data structure. Exemplary system 100 may also include a control-invoking module 110 programmed to use object-tree paths to automatically identify and invoke user-interface controls during subsequent quality-assurance reviews. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, as will be described in greater detail below, one or more of modules 102 may represent software modules stored and configured to run on one or more computing devices, such as the devices illustrated in FIG. 2 (e.g., computing subsystems 202, 206, and/or 208), computing system 710 in FIG. 7, and/or portions of exemplary network architecture 800 in FIG. 8. One or more of modules 102 in FIG. 1 may also represent all or portions of one or more special-purpose computers configured to perform one or more tasks.

As illustrated in FIG. 1, exemplary system 100 may also include an object-tree-path database 120. In one embodiment, and as will be explained in greater detail below, object-tree-path database 120 may contain one or more database files 122 containing information that identifies object-tree paths for invoking one or more user-interface controls.

Database 120 may represent portions of a single database or computing device or a plurality of databases or computing devices. For example, database 120 may represent a portion of computing subsystems 202, 206, and/or 208 in FIG. 2, computing system 710 in FIG. 7, and/or portions of exemplary network architecture 800 in FIG. 8. Alternatively, database 120 in FIG. 1 may represent one or more physically separate devices capable of being accessed by a computing device, such as computing subsystems 202, 206, and/or 208 in FIG. 2, computing system 710 in FIG. 7, and/or portions of exemplary network architecture 800 in FIG. 8.

System 100 in FIG. 1 may be implemented or deployed in a variety of ways. For example, all or a portion of exemplary system 100 may represent portions of a cloud-computing or network-based environment, such as exemplary system 200 illustrated in FIG. 2. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In one example, system 100 may represent a portion of exemplary system 200 in FIG. 2. As illustrated in this figure, exemplary system 200 may include a computing subsystem 202 in communication with computing subsystems 206 and 208 via a network 204. In one example, and as will be explained in greater detail below, system 100 from FIG. 1 may cause computing subsystem 202 to: 1) identify at least one user-interface control invoked during an initial quality-assurance review of a user interface, 2) for each identified user-interface control, identify an object-tree path that is followed when invoking the user-interface control, 3) store the object-tree path for the user-interface control in a data structure (such as a database file in database 120), and then 4) use the object-tree path to automatically identify and invoke the user-interface control during a subsequent quality-assurance review.

Similarly, as will be described in greater detail below, computing subsystems 202, 206, and/or 208 may be programmed to: 1) identify, during subsequent quality-assurance reviews of the user interface, an object-tree path associated with a user-interface control that was invoked during a prior quality-assurance review of the user interface (such as a prior quality-assurance review conducted on computing subsystem 202, as described above), 2) retrieve the object-tree path associated with the user-interface control from a data structure (such as database 120), and then 3) use the object-tree path to automatically invoke the user-interface control.

Computing subsystems 222, 224, and 230 generally represent any type or form of computing device capable of reading computer-executable instructions. Examples of computing subsystems 222, 224, and 230 include, without limitation, laptops, desktops, servers, cellular phones, personal digital assistants (PDAs), multimedia players, embedded systems, combinations of one or more of the same, exemplary computing system 710 in FIG. 7, or any other suitable computing device.

Network 204 generally represents any medium or architecture capable of facilitating communication or data transfer. Examples of network 204 include, without limitation, an intranet, a wide area network (WAN), a local area network (LAN), a personal area network (PAN), the Internet, power line communications (PLC), a cellular network (e.g., a GSM Network), exemplary network architecture 800 in FIG. 8, or the like. Network 204 may facilitate communication or data transfer using wireless or wired connections. In one embodiment, network 204 may facilitate communication between computing subsystem 202 and computing subsystems 206 and 208.

Figure 3:
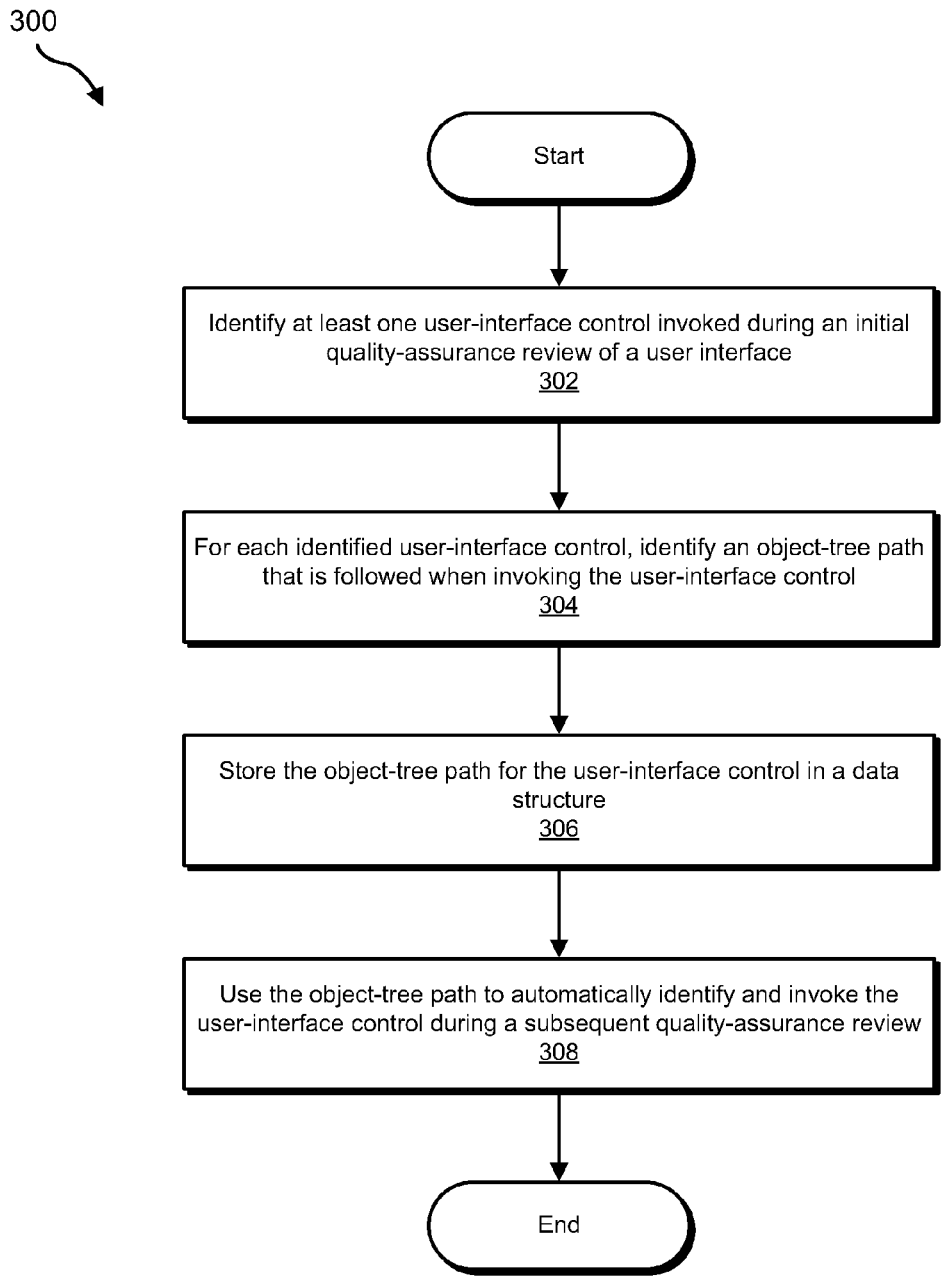
FIG. 3 is a flow diagram of an exemplary method for reliably identifying controls invoked during quality-assurance reviews of user interfaces.

FIG. 3 is a flow diagram of an exemplary computer-implemented method 300 for reliably identifying controls invoked during quality-assurance reviews of user interfaces. The steps shown in FIG. 3 may be performed by any suitable computer-executable code and/or computing system. In some embodiments, the steps shown in FIG. 3 may be performed by one or more of the components of system 100 in FIG. 1 and/or system 200 in FIG. 2.

As illustrated in FIG. 3, at step 302 the various systems described herein may identify at least one user-interface control invoked during an initial quality-assurance review of a graphical user interface. For example, control-identification module 104 in FIG. 1 (which may, as mentioned above, be stored and configured to run on computing subsystem 202 in FIG. 2) may identify or detect a user-interface control invoked during an initial quality-assurance review of a user interface on computing subsystem 202.

Control-identification module 104 may identify user-interface controls that are invoked during quality-assurance reviews in a variety of ways. In one example, control-identification module 104 may identify a user-interface control by: 1) detecting an action performed by a quality-assurance engineer (such as a mouse click or key press) and then 2) identifying a user-interface control that is the target of the user action. For example, control-identification module 104 may detect a left mouse click at position 1582×987 in the user interface's main window. Control-identification module 104 may then identify a user-interface control (such as a push button) that is located at position 1582×987.

In some examples, control-identification module 104 may identify at least one property associated with the invoked user-interface control. Examples of such properties include, without limitation, a handle associated with the control, a class associated with the control, a style associated with the control, a text caption associated with the control, a unique control identifier assigned to the control, X/Y coordinates for an object associated with the control, the width and height of an object associated with the control, and/or any other property that may be used to identify the control.

Figure 4:
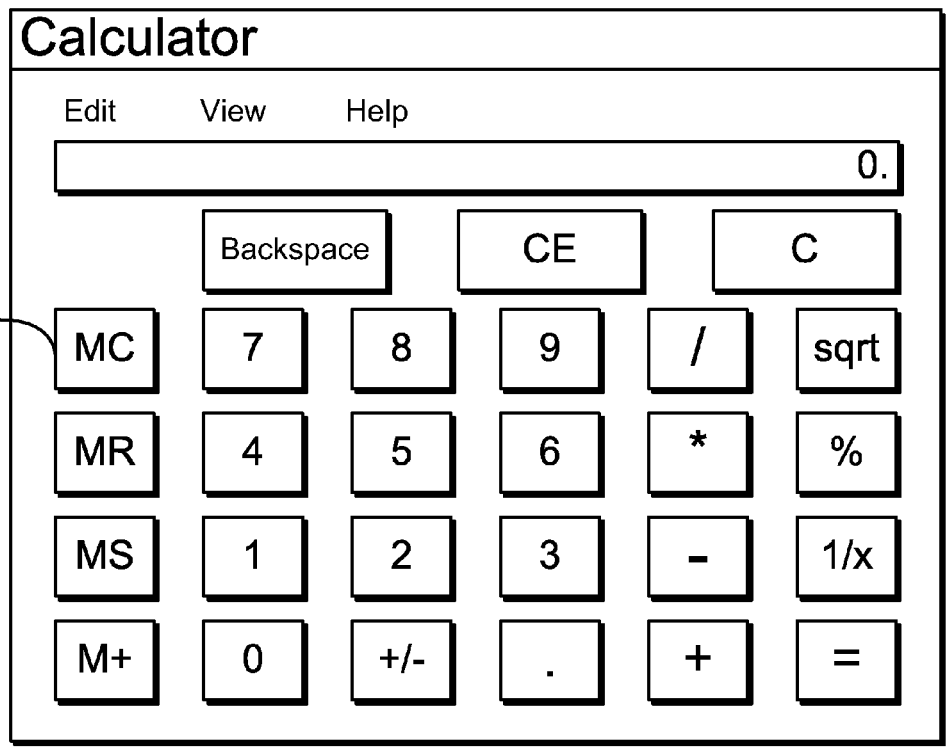
FIG. 4 is a block diagram of an exemplary user interface.

For example, if a quality-assurance engineer selects (using, e.g., a user-input device such as a mouse or keyboard) push button 410 in the exemplary graphical user interface 400 illustrated in FIG. 4, then control-identification module 104 may attempt to identify or determine the width and height of button 410, the X/Y coordinates of button 410, a text caption associated with button 410 (in this example, "MC"), a class associated with button 410 (in this example, "push button"), a handle associated with button 410, a style associated with button 410, and/or a control identifier assigned to button 410.

In some embodiments, control-identification module 104 may also identify a process or main window associated with the user-interface control identified in step 302. For example, control-identification module 104 may determine that button 410 in FIG. 4 is associated with a process named "calculator.exe" and originates from a window labeled "Calculator."

Returning to FIG. 3, at step 304 the system may identify, for each user-interface control identified in step 302, an object-tree path that is followed when invoking the user-interface control. For example, path-identification module 106 from FIG. 1 (which may, as detailed above, be stored and configured to run on computing subsystem 202 in FIG. 2) may identify or create an object-tree path that is followed when the user-interface control identified in step 302 is invoked.

Figure 5:
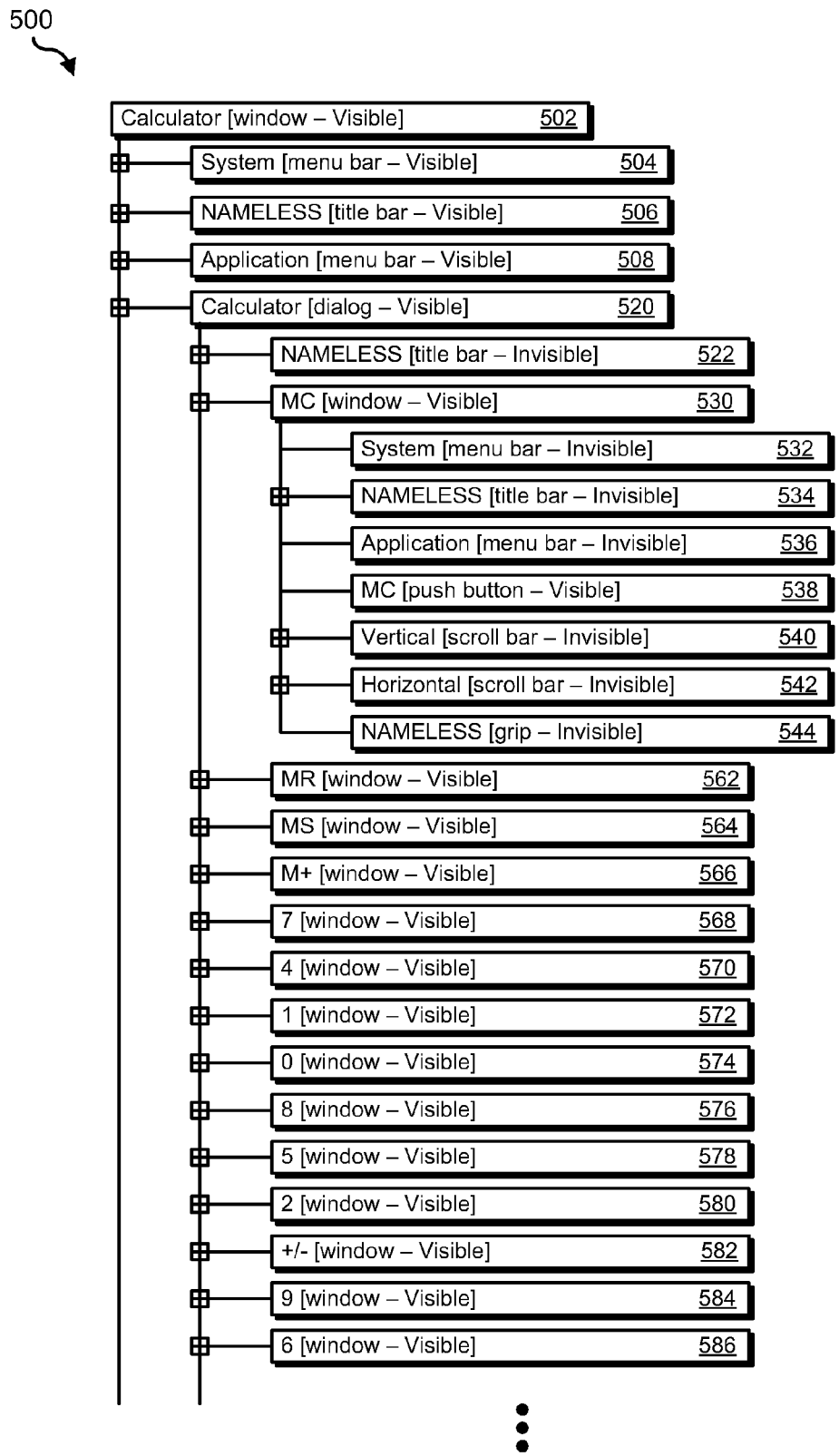
FIG. 5 is an object-tree path for the exemplary user-interface control invoked in FIG. 4.

The phrase "object-tree path" generally refers to a path that is followed, relative to other control layers or objects in a graphical user interface, when invoking a user-interface control. Path-identification module 106 may identify the object-tree path followed by a user-interface control in a variety of ways. In one embodiment, path-identification module 106 may, by querying an operating system on which graphical user interface 400 in FIG. 4 runs, identify the various control layers that exist within user interface 400. Path-identification module 106 may then arrange these layers, along with the various control objects contained within these layers, into a tree-like formation. For example, as illustrated in FIG. 5, path-identification module 106 may create an object-tree path 500 for graphical user interface 400 from FIG. 4. As illustrated in FIG. 5, object tree 500 may identify the various control layers (such as control layers 502, 520, etc.) and control objects (such as control objects 532, 536, 538, 544, etc.), and relationships between the same, within graphical user interface 400.

Upon creating object tree 500 in FIG. 5, path-identification module 106 may identify a path through object tree 500 that is followed when invoking the user-interface control (in this example, push button 410 "MC" in FIG. 4). For example, path-identification module 106 may determine that the user-interface control "MC" (i.e., push button 410 in FIG. 4) represents the fourth control object (object 538: "MC [push button—visible]") within the second control layer (layer 530: "MC [window—visible]") within the fourth control layer (layer 520: "Calculator [dialog—visible]") within the main window "Calculator" (layer 502: "Calculator [window—visible]"). As such, path-identification module 106 may determine that the object-tree path followed when invoking the user-interface control "MC" from the main window "Calculator" is 4=2=4 (i.e., fourth layer, second layer, fourth object).

In some embodiments, path-identification module 106 may, upon identifying an object-tree path that is followed when invoking a user-interface control, add missing elements to this object-tree path and/or remove unnecessary elements from this object-tree path. For example, path-identification module 106 may identify and add missing elements (such as control layers or objects) that form a portion of the path that is followed when invoking the user-interface control "MC." Similarly, path-identification module 106 may remove elements (such as control layers and control objects) from object tree 500 that do not help identify the object-tree path followed when invoking user-interface control "MC."

In some embodiments, upon identifying the object-tree path in step 304, path-identification module 106 may also verify that this object-tree path correctly invokes the user-interface control identified in step 302. For example, path-identification module 106 may, upon creating or identifying an object-tree path for the user-interface control "MC" (in this example, 4=2=4), verify that this object-tree path correctly invokes the control "MC" by attempting to navigate from the desktop or main window of the user interface to the specified control. If path-identification module 106 verifies that the object-tree path identified in step 304 correctly invokes the user-interface control identified in step 302, then control of exemplary method 300 may proceed to step 306.

At step 306, the system may store the object-tree path identified in step 304 in a data structure. For example, storage module 108 from FIG. 1 (which may, as detailed above, be stored and configured to run on computing subsystem 202 in FIG. 2) may store information that identifies the object-tree path identified or created in step 304 in database file 122 in object-tree-path database 120 in FIG. 1.

Storage module 108 may perform step 306 in a variety of ways. In one example, storage module 108 may simply store information that identifies the object-tree path for the identified user-interface control in database 120. In other embodiments, storage modules 108 may store additional information, such as the process or main window associated with the user-interface control or one or more properties of the user-interface control (such as, e.g., the control's handle, class, style, control identifier, text caption, X/Y coordinates, and/or width and height), in database 120. As detailed above, this information may be stored in a variety of ways and in a variety of formats. For example, this information may be stored in an XML or other database file within database 120 in FIG. 1.

At step 308, the system may use the object-tree path identified or created in step 304 to automatically identify and invoke the user-interface control identified in step 302 during a subsequent quality-assurance review. For example, control-invoking module 110 in FIG. 1 (which may, as detailed above, be stored and configured to run on computing subsystem 202 in FIG. 2) may use the object-tree path for the control "MC" in FIG. 4 to invoke this control during a subsequent quality-assurance review of graphical user interface 400 in FIG. 4. Upon completion of step 308, exemplary method 300 in FIG. 3 may terminate.

As used herein, the phrase "subsequent quality-assurance review" may refer to a quality-assurance review that occurs in an environment that differs from an environment in which an initial quality-assurance review occurred. The environment of this subsequent quality-assurance review may differ from the environment of an initial quality-assurance review in a variety of ways. For example, the subsequent quality-assurance review may involve a review of a different version of a user interface (such as an operating-system-specific version or language-specific version of a user interface), a different build of the user interface, or the like. In one example, all user-interface controls invoked by a quality-assurance engineer during an initial quality assurance review may be automatically recorded and played back during subsequent quality-assurance reviews to quickly and efficiently test different versions and builds of a user interface.

Control-invoking module 110 may use object-tree paths to automatically identify and invoke user-interface controls in a variety of ways. In one example, control-invoking module 110 may invoke a user-interface control by: 1) retrieving an object-tree path associated with the user-interface control from database 120 and then 2) following this object-tree path on the user interface to invoke the user-interface control. For example, control-invoking module 110 may, during a subsequent quality-assurance review of a different version or build of user interface 400 in FIG. 4, automatically identify and invoke the user-interface control "MC" from FIG. 4 by: 1) retrieving information from database 120 in FIG. 1 that identifies an object-tree path for invoking this control (e.g., the path followed through object tree 500 in FIG. 5 to invoke the control "MC," which, in this example, is 4=2=4) and then 2) invoking the control "MC" on a subsequent build or version of user interface 400 by following the object-tree path for control "MC." For example, control-invoking module 110 may invoke the fourth control object (object 538: "MC [push button—visible]") within the second control layer (layer 530: "MC [window—visible]") within the fourth control layer (layer 520: "Calculator [dialog—visible]") within the main window "Calculator" (layer 502: "Calculator [window—visible]") of user interface 400 in FIG. 4.

In some examples, control-invoking module 110 may, prior to attempting to invoke a user-interface control: 1) retrieve information from database 120 in FIG. 1 (such as an XML-based database file in database 120) that identifies a process or main window associated with the user-interface control and then 2) instantiate this process or main window. For example, control-invoking module 110 may, prior to attempting to invoke the control "MC" from FIG. 4: 1) retrieve information from database 120 in FIG. 1 that indicates that the control "MC" originates from the process "calculator.exe" and the main window "Calculator" and then 2) instantiate the process "calculator.exe" and/or activate the main window "Calculator."

Additionally or alternatively, control-invoking module 110 may: 1) identify at least one property (such as the handle, class, style, etc.) of the user-interface control to be invoked by the object-tree path during the subsequent quality-assurance review and then 2) determine whether these properties match properties associated with the user-interface control that were identified during a prior quality-assurance review. For example, if, during an initial quality-assurance review, path-identification module 106 determines that the user-interface control "MC" in FIG. 4 represents a visible push button, then, during a subsequent quality-assurance review, control-invoking module 110 may, prior to invoking the user-interface control "MC," verify that the user-interface control pointed to by the object-tree path retrieved from database 120 represents a visible push button. If control-invoking module 110 determines that these properties match, then control-invoking module 110 may determine that the user-interface control has been correctly identified and may invoke the same.

Figure 6:
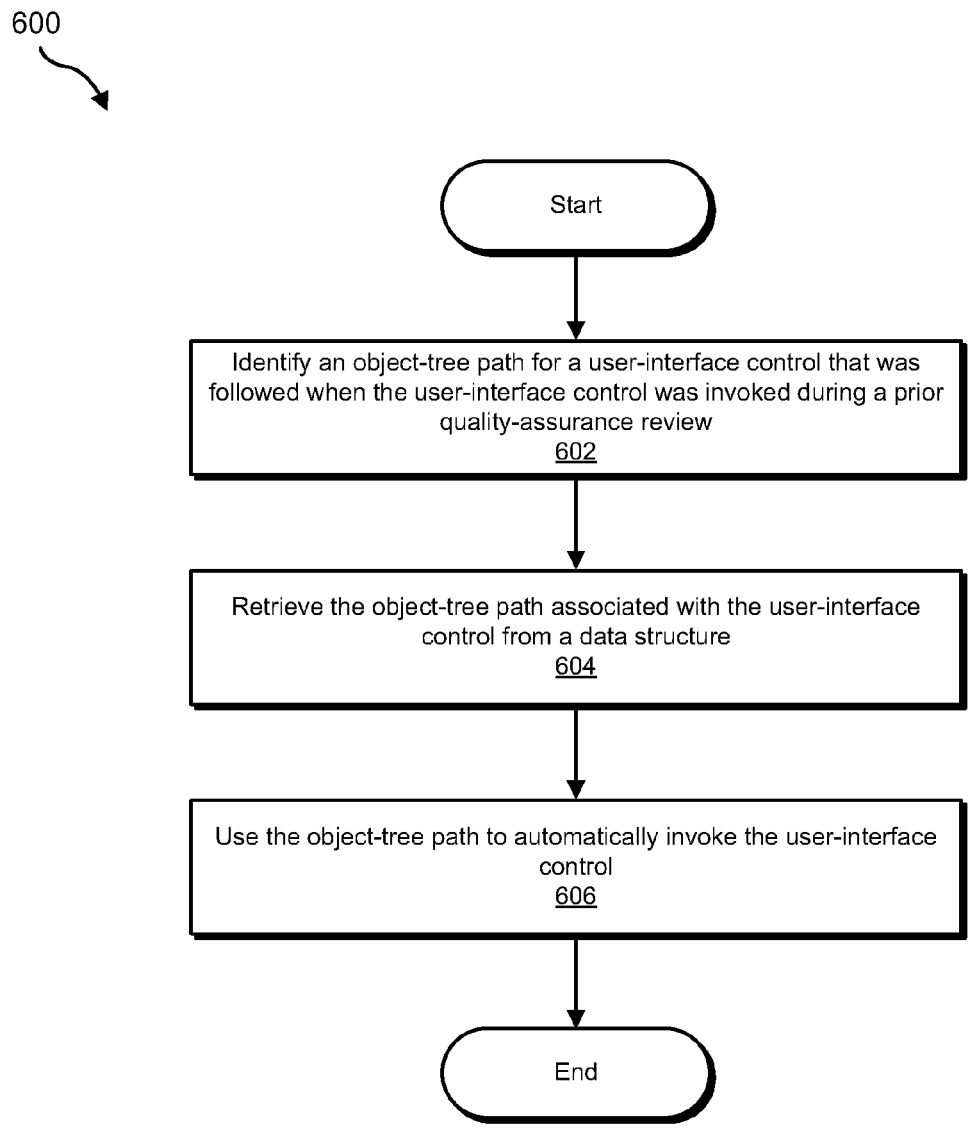
FIG. 6 is a flow diagram of an exemplary method for automatically and reliably invoking controls during quality-assurance reviews of user interfaces.

As detailed above, the systems and methods disclosed herein may also be used to automatically and reliably invoke controls during automated quality-assurance reviews of different versions and builds of a user interface. FIG. 6 is a flow diagram of an exemplary computer-implemented method 600 for performing such a task. The steps shown in FIG. 6 may be performed by any suitable computer-executable code and/or computing system. In some embodiments, the steps shown in FIG. 6 may be performed by one or more of the components of system 100 in FIG. 1 and/or system 200 and FIG. 2.

As illustrated in FIG. 6, the system may automatically invoke a user-interface control during a quality-assurance review of a user interface by: 1) identifying an object-tree path that was followed when the user-interface control was invoked during a prior quality-assurance review (step 602), 2) retrieving the object-tree path associated with the user-interface control from a data structure (step 604), and then 3) using the object-tree path to automatically invoke the user-interface control (step 606).

For example, computing subsystems 202, 206, and/or 208 in FIG. 2 may automatically invoke the user-interface control "MC" during an automated quality-assurance review of a different version or build of graphical user interface 400 in FIG. 4 by: 1) retrieving, from database 120 in FIG. 1, information that identifies an object-tree path that was followed when the control "MC" was invoked during a prior quality-assurance review (such as the path followed through object tree 500 in FIG. 5, as detailed above) and then 2) using this object-tree path to automatically invoke the control "MC," as detailed above.

As detailed above, by creating an object-path tree for each user-interface control that is invoked during a quality-assurance review of a user interface, the systems and methods disclosed herein may be able to automatically, efficiently, and reliably identify and record each user-interface control that is invoked by a quality-assurance engineer during his/her initial review of the user interface. As detailed above, this object-tree path may then be used to reliably and automatically invoke user-interface controls during subsequent automated quality-assurance reviews of the user interface in order to quickly and efficiently test different versions and builds of the interface.

Figure 7:
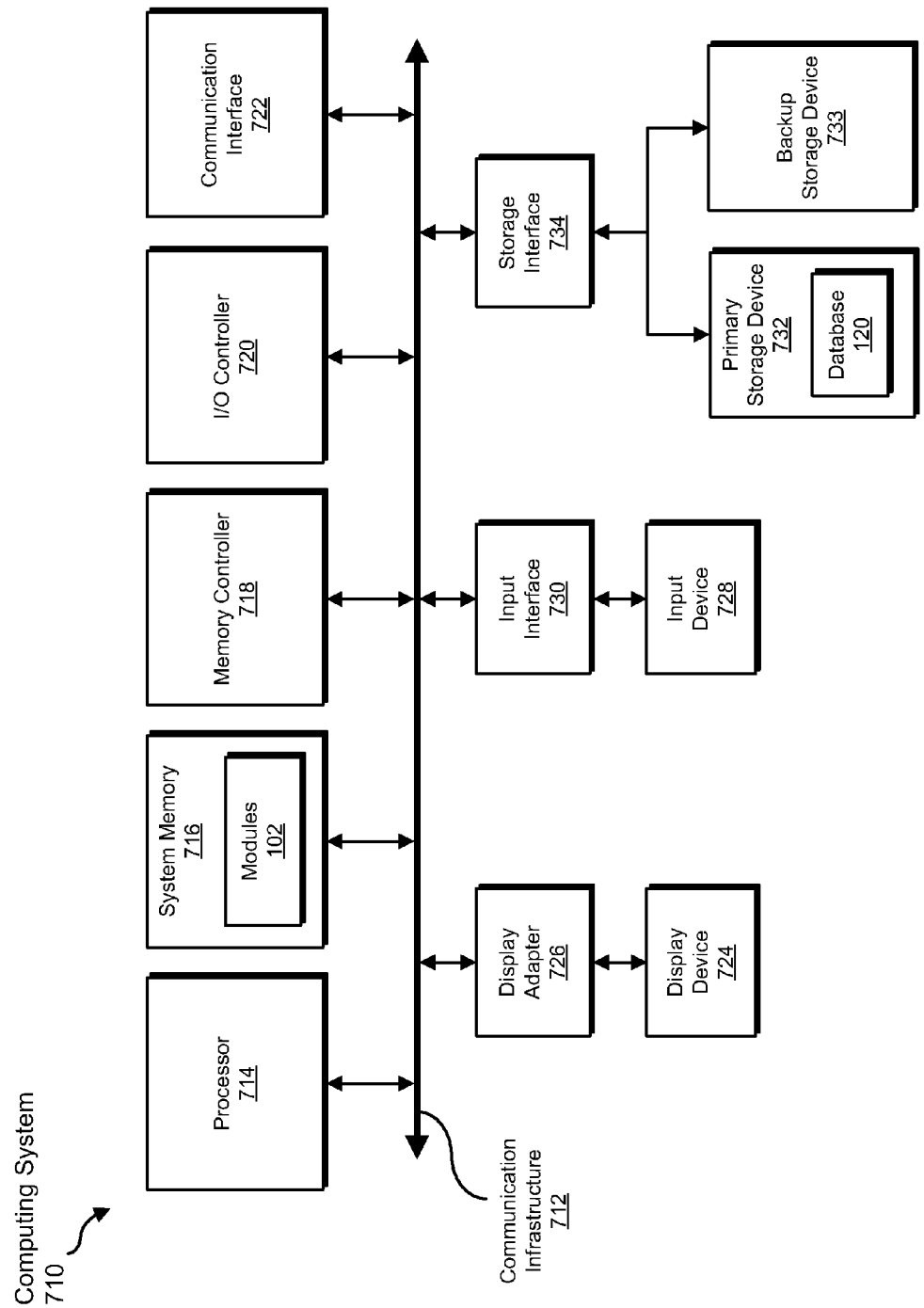
FIG. 7 is a block diagram of an exemplary computing system capable of implementing one or more of the embodiments described and/or illustrated herein.

FIG. 7 is a block diagram of an exemplary computing system 710 capable of implementing one or more of the embodiments described and/or illustrated herein. Computing system 710 broadly represents any single or multi-processor computing device or system capable of executing computer-readable instructions. Examples of computing system 710 include, without limitation, workstations, laptops, client-side terminals, servers, distributed computing systems, handheld devices, or any other computing system or device. In its most basic configuration, computing system 710 may include at least one processor 714 and a system memory 716.

Processor 714 generally represents any type or form of processing unit capable of processing data or interpreting and executing instructions. In certain embodiments, processor 714 may receive instructions from a software application or module. These instructions may cause processor 714 to perform the functions of one or more of the exemplary embodiments described and/or illustrated herein. For example, processor 714 may perform and/or be a means for performing, either alone or in combination with other elements, one or more of the identifying, storing, using, invoking, creating, removing, adding, determining, and retrieving steps described herein. Processor 714 may also perform and/or be a means for performing any other steps, methods, or processes described and/or illustrated herein.

System memory 716 generally represents any type or form of volatile or non-volatile storage device or medium capable of storing data and/or other computer-readable instructions. Examples of system memory 716 include, without limitation, random access memory (RAM), read only memory (ROM), flash memory, or any other suitable memory device. Although not required, in certain embodiments computing system 710 may include both a volatile memory unit (such as, for example, system memory 716) and a non-volatile storage device (such as, for example, primary storage device 732, as described in detail below). In one example, one or more of modules 102 from FIG. 1 may be loaded into system memory 716.

In certain embodiments, exemplary computing system 710 may also include one or more components or elements in addition to processor 714 and system memory 716. For example, as illustrated in FIG. 7, computing system 710 may include a memory controller 718, an Input/Output (I/O) controller 720, and a communication interface 722, each of which may be interconnected via a communication infrastructure 712. Communication infrastructure 712 generally represents any type or form of infrastructure capable of facilitating communication between one or more components of a computing device. Examples of communication infrastructure 712 include, without limitation, a communication bus (such as an ISA, PCI, PCIe, or similar bus) and a network.

Memory controller 718 generally represents any type or form of device capable of handling memory or data or controlling communication between one or more components of computing system 710. For example, in certain embodiments memory controller 718 may control communication between processor 714, system memory 716, and I/O controller 720 via communication infrastructure 712. In certain embodiments, memory controller may perform and/or be a means for performing, either alone or in combination with other elements, one or more of the steps or features described and/or illustrated herein, such as identifying, storing, using, invoking, creating, removing, adding, determining, and retrieving.

I/O controller 720 generally represents any type or form of module capable of coordinating and/or controlling the input and output functions of a computing device. For example, in certain embodiments I/O controller 720 may control or facilitate transfer of data between one or more elements of computing system 710, such as processor 714, system memory 716, communication interface 722, display adapter 726, input interface 730, and storage interface 734. I/O controller 720 may be used, for example, to perform and/or be a means for performing, either alone or in combination with other elements, one or more of the identifying, storing, using, invoking, creating, removing, adding, determining, and retrieving steps described herein. I/O controller 720 may also be used to perform and/or be a means for performing other steps and features set forth in the instant disclosure.

Communication interface 722 broadly represents any type or form of communication device or adapter capable of facilitating communication between exemplary computing system 710 and one or more additional devices. For example, in certain embodiments communication interface 722 may facilitate communication between computing system 710 and a private or public network including additional computing systems. Examples of communication interface 722 include, without limitation, a wired network interface (such as a network interface card), a wireless network interface (such as a wireless network interface card), a modem, and any other suitable interface. In at least one embodiment, communication interface 722 may provide a direct connection to a remote server via a direct link to a network, such as the Internet. Communication interface 722 may also indirectly provide such a connection through, for example, a local area network (such as an Ethernet network), a personal area network, a telephone or cable network, a cellular telephone connection, a satellite data connection, or any other suitable connection.

In certain embodiments, communication interface 722 may also represent a host adapter configured to facilitate communication between computing system 710 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 722 may also allow computing system 710 to engage in distributed or remote computing. For example, communication interface 722 may receive instructions from a remote device or send instructions to a remote device for execution. In certain embodiments, communication interface 722 may perform and/or be a means for performing, either alone or in combination with other elements, one or more of the identifying, storing, using, invoking, creating, removing, adding, determining, and retrieving steps disclosed herein. Communication interface 722 may also be used to perform and/or be a means for performing other steps and features set forth in the instant disclosure.

As illustrated in FIG. 7, computing system 710 may also include at least one display device 724 coupled to communication infrastructure 712 via a display adapter 726. Display device 724 generally represents any type or form of device capable of visually displaying information forwarded by display adapter 726. Similarly, display adapter 726 generally represents any type or form of device configured to forward graphics, text, and other data from communication infrastructure 712 (or from a frame buffer, as known in the art) for display on display device 724.

As illustrated in FIG. 7, exemplary computing system 710 may also include at least one input device 728 coupled to communication infrastructure 712 via an input interface 730. Input device 728 generally represents any type or form of input device capable of providing input, either computer or human generated, to exemplary computing system 710. Examples of input device 728 include, without limitation, a keyboard, a pointing device, a speech recognition device, or any other input device. In at least one embodiment, input device 728 may perform and/or be a means for performing, either alone or in combination with other elements, one or more of the identifying, storing, using, invoking, creating, removing, adding, determining, and retrieving steps disclosed herein. Input device 728 may also be used to perform and/or be a means for performing other steps and features set forth in the instant disclosure.

As illustrated in FIG. 7, exemplary computing system 710 may also include a primary storage device 732 and a backup storage device 733 coupled to communication infrastructure 712 via a storage interface 734. Storage devices 732 and 733 generally represent any type or form of storage device or medium capable of storing data and/or other computer-readable instructions. For example, storage devices 732 and 733 may be a magnetic disk drive (e.g., a so-called hard drive), a floppy disk drive, a magnetic tape drive, an optical disk drive, a flash drive, or the like. Storage interface 734 generally represents any type or form of interface or device for transferring data between storage devices 732 and 733 and other components of computing system 710. In one example, database 120 from FIG. 1 may be stored in primary storage device 732.

In certain embodiments, storage devices 732 and 733 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 732 and 733 may also include other similar structures or devices for allowing computer software, data, or other computer-readable instructions to be loaded into computing system 710. For example, storage devices 732 and 733 may be configured to read and write software, data, or other computer-readable information. Storage devices 732 and 733 may also be a part of computing system 710 or may be a separate device accessed through other interface systems.

In certain embodiments, storage devices 732 and 733 may be used, for example, to perform and/or be a means for performing, either alone or in combination with other elements, one or more of the identifying, storing, using, invoking, creating, removing, adding, determining, and retrieving steps disclosed herein. Storage devices 732 and 733 may also be used to perform and/or be a means for performing other steps and features set forth in the instant disclosure.

Many other devices or subsystems may be connected to computing system 710. Conversely, all of the components and devices illustrated in FIG. 7 need not be present to practice the embodiments described and/or illustrated herein. The devices and subsystems referenced above may also be interconnected in different ways from that shown in FIG. 7. Computing system 710 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium" generally refers to any form of device, carrier, or medium capable of storing or carrying computer-readable instructions. Examples of computer-readable media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable medium containing the computer program may be loaded into computing system 710. All or a portion of the computer program stored on the computer-readable medium may then be stored in system memory 716 and/or various portions of storage devices 732 and 733. When executed by processor 714, a computer program loaded into computing system 710 may cause processor 714 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 710 may be configured as an application specific integrated circuit (ASIC) adapted to implement one or more of the exemplary embodiments disclosed herein.

Figure 8:
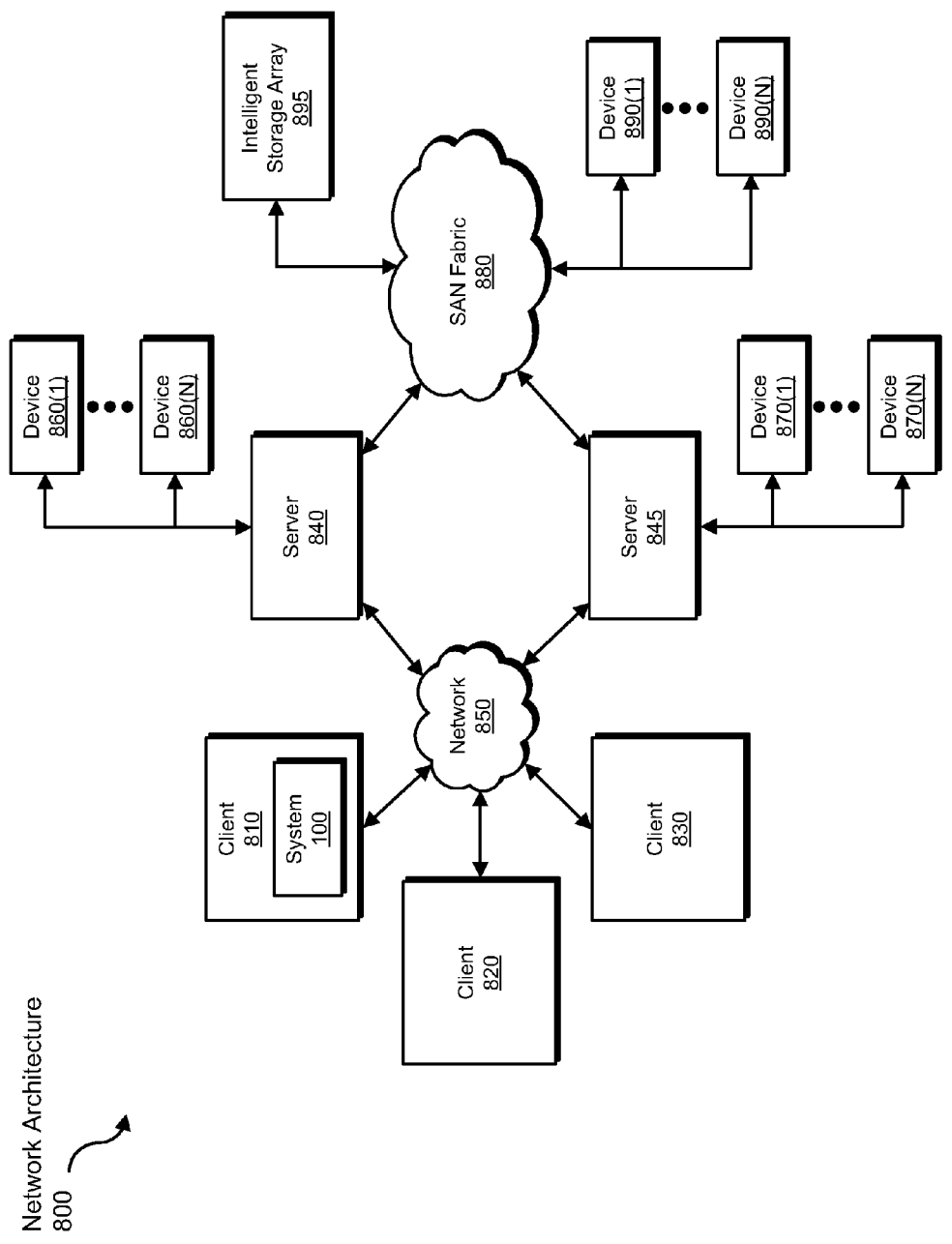
FIG. 8 is a block diagram of an exemplary computing network capable of implementing one or more of the embodiments described and/or illustrated herein.

FIG. 8 is a block diagram of an exemplary network architecture 800 in which client systems 810, 820, and 830 and servers 840 and 845 may be coupled to a network 850. Client systems 810, 820, and 830 generally represent any type or form of computing device or system, such as exemplary computing system 710 in FIG. 7. In one example, client system 810 may include system 100 from FIG. 1.

Similarly, servers 840 and 845 generally represent computing devices or systems, such as application servers or database servers, configured to provide various database services and/or run certain software applications. Network 850 generally represents any telecommunication or computer network including, for example, an intranet, a wide area network (WAN), a local area network (LAN), a personal area network (PAN), or the Internet.

As illustrated in FIG. 8, one or more storage devices 860(1)-(N) may be directly attached to server 840. Similarly, one or more storage devices 870(1)-(N) may be directly attached to server 845. Storage devices 860(1)-(N) and storage devices 870(1)-(N) generally represent any type or form of storage device or medium capable of storing data and/or other computer-readable instructions. In certain embodiments, storage devices 860(1)-(N) and storage devices 870(1)-(N) may represent network-attached storage (NAS) devices configured to communicate with servers 840 and 845 using various protocols, such as NFS, SMB, or CIFS.

Servers 840 and 845 may also be connected to a storage area network (SAN) fabric 880. SAN fabric 880 generally represents any type or form of computer network or architecture capable of facilitating communication between a plurality of storage devices. SAN fabric 880 may facilitate communication between servers 840 and 845 and a plurality of storage devices 890(1)-(N) and/or an intelligent storage array 895. SAN fabric 880 may also facilitate, via network 850 and servers 840 and 845, communication between client systems 810, 820, and 830 and storage devices 890(1)-(N) and/or intelligent storage array 895 in such a manner that devices 890(1)-(N) and array 895 appear as locally attached devices to client systems 810, 820, and 830. As with storage devices 860(1)-(N) and storage devices 870(1)-(N), storage devices 890(1)-(N) and intelligent storage array 895 generally represent any type or form of storage device or medium capable of storing data and/or other computer-readable instructions.

In certain embodiments, and with reference to exemplary computing system 710 of FIG. 7, a communication interface, such as communication interface 722 in FIG. 7, may be used to provide connectivity between each client system 810, 820, and 830 and network 850. Client systems 810, 820, and 830 may be able to access information on server 840 or 845 using, for example, a web browser or other client software. Such software may allow client systems 810, 820, and 830 to access data hosted by server 840, server 845, storage devices 860(1)-(N), storage devices 870(1)-(N), storage devices 890(1)-(N), or intelligent storage array 895. Although FIG. 8 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 840, server 845, storage devices 860(1)-(N), storage devices 870(1)-(N), storage devices 890(1)-(N), intelligent storage array 895, or any combination thereof. All or a portion of one or more of the exemplary embodiments disclosed herein may also be encoded as a computer program, stored in server 840, run by server 845, and distributed to client systems 810, 820, and 830 over network 850. Accordingly, network architecture 800 may perform and/or be a means for performing, either alone or in combination with other elements, one or more of the identifying, storing, using, invoking, creating, removing, adding, determining, and retrieving steps disclosed herein. Network architecture 800 may also be used to perform and/or be a means for performing other steps and features set forth in the instant disclosure.

As detailed above, computing system 710 and/or one or more components of network architecture 800 may perform and/or be a means for performing, either alone or in combination with other elements, one or more steps of an exemplary method for reliably identifying controls invoked during quality-assurance reviews of user interfaces. In one example, such a method may include: 1) identifying at least one user-interface control invoked during an initial quality-assurance review of a user interface, 2) for each identified user-interface control, identifying an object-tree path that is followed when invoking the user-interface control, 3) storing the object-tree path for the user-interface control in a data structure, and then 4) during a subsequent quality-assurance review, using the object-tree path to automatically identify and invoke the user-interface control.

In some examples, identifying the object-tree path that is followed when invoking the user-interface control may include: 1) creating an object tree for the user interface and 2) identifying a path through the object tree that is followed when invoking the user-interface control. In addition, identifying the object-tree path may include identifying and adding missing elements to the object-tree path and/or identifying and removing unnecessary elements from the object-tree path. In one example, the method may also include, upon identifying the object-tree path, verifying that the object-tree path correctly invokes the user-interface control.

In some examples, the subsequent quality-assurance review may occur in an environment that differs from an environment in which the initial quality-assurance review occurred. In this example, the environment of the subsequent quality-assurance review may differ from the environment of the initial quality-assurance review by a different version and/or build of the user interface. In addition, the initial quality-assurance review may represent an automated recording operation while the subsequent quality-assurance review may represent an automated playback operation.

In one example, identifying the user-interface control may include identifying a process associated with the user-interface control. In this example, using the object-tree path to automatically identify and invoke the user-interface control may include instantiating the process associated with the user-interface control prior to invoking the user-interface control during the subsequent quality-assurance review. In one example, the data structure may represent a database file in a database.

In addition, identifying the user-interface control may include identifying at least one property of the user-interface control invoked during the initial quality-assurance review. In this example, using the object-tree path to automatically identify and invoke the user-interface control may include: 1) identifying at least one property of the user-interface control to be invoked by the object-tree path during the subsequent quality-assurance review and then 2) determining whether the property identified during the subsequent quality-assurance review matches the property identified during the initial quality-assurance review. Examples of properties of the user-interface control include a handle associated with the user-interface control, a class associated with the user-interface control, a style associated with the user-interface control, a text caption associated with the user-interface control, a unique control identifier assigned to the user-interface control, X/Y coordinates for an object associated with the user-interface control, the width and height of an object associated with the user-interface control, and/or any other property that may be used to identify the user-interface control.

In one embodiment, a computer-implemented method for automatically and reliably invoking controls during quality-assurance reviews of user interfaces may include automatically invoking a user-interface control during a quality-assurance review of a user interface by: 1) identifying an object-tree path that was followed when the user-interface control was invoked during a prior quality-assurance review, 2) retrieving the object-tree path associated with the user-interface control from a data structure, and then 3) using the object-tree path to automatically invoke the user-interface control.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, storage module 108 in FIG. 1 may transform a property or characteristic of database 120 by storing and/or modifying database files 122 in database 120.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for reliably identifying controls invoked during quality-assurance reviews of user interfaces, at least a portion of the method being performed by a computing device comprising at least one processor, the method comprising:
   automatically recording at least one user-interface control invoked by a quality-assurance engineer during an initial quality-assurance review of a user interface by:
      identifying an object tree associated with the user interface that identifies relationships between control layers and control objects within the user interface;
      recording, in a data structure, a path through the user interface's object tree that was followed when the user-interface control was invoked by the quality-assurance engineer;
   during a subsequent quality-assurance review of the user interface, automatically playing back the user-interface control that was invoked by the quality-assurance engineer during the initial quality-assurance review by:
      retrieving the recorded path from the data structure;
      following the recorded path through the user interface's object tree to identify and invoke the user-interface control.

2. The method of claim 1, wherein identifying the object tree comprises creating the object tree.

3. The method of claim 1, further comprising at least one of:
   identifying and adding missing elements to the recorded path;
   identifying and removing unnecessary elements from the recorded path.

4. The method of claim 1, further comprising, upon recording the path, verifying that the recorded path correctly invokes the user-interface control.

5. The method of claim 1, wherein the subsequent quality-assurance review occurs in an environment that differs from an environment in which the initial quality-assurance review occurred.

6. The method of claim 5, wherein the environment of the subsequent quality-assurance review differs from the environment of the initial quality-assurance review by at least one of:
   a different version of the user interface;
   a different build of the user interface.

7. The method of claim 1, wherein recording the user-interface control comprises identifying and recording a process associated with the user-interface control.

8. The method of claim 7, wherein playing back the user-interface control comprises instantiating the process associated with the user-interface control prior to invoking the user-interface control during the subsequent quality-assurance review.

9. The method of claim 1, wherein recording the user-interface control comprises identifying and recording at least one property of the user-interface control.

10. The method of claim 9, wherein the property of the user-interface control comprises at least one of:
   a handle associated with the user-interface control;
   a class associated with the user-interface control;
   a style associated with the user-interface control;
   a text caption associated with the user-interface control;
   a unique control identifier assigned to the user-interface control;
   X/Y coordinates for an object associated with the user-interface control;
   the width and height of an object associated with the user-interface control.

11. The method of claim 9, further comprising:
   identifying at least one property of a user-interface control that will be invoked by following the recorded path during the subsequent quality-assurance review;
   determining whether the identified property matches the recorded property.

12. The method of claim 1, wherein the data structure comprises a database file in a database.

13. A computer-implemented method for automatically and reliably invoking controls during quality-assurance reviews of user interfaces, at least a portion of the method being performed by a computing device comprising at least one processor, the method comprising:
   during a quality-assurance review of a user interface, automatically playing back a user-interface control that was recorded upon being invoked by a quality-assurance engineer during a prior quality-assurance review of the user interface by:
      identifying a data structure that contains a path through an object tree of the user interface that was followed and recorded when the user-interface control was invoked by the quality-assurance engineer during the prior quality-assurance review, wherein the object tree identifies relationships between control layers and control objects within the user interface;
      retrieving the recorded path from the data structure;
      following the recorded path through the user interface's object tree to identify and invoke the user-interface control.

14. The method of claim 13, wherein the data structure further identifies a process associated with the user-interface control.

15. The method of claim 14, wherein playing back the user-interface control comprises instantiating the process associated with the user-interface control prior to invoking the user-interface control during the quality-assurance review.

16. The method of claim 13, wherein the data structure further identifies at least one property associated with the user-interface control.

17. The method of claim 16, further comprising:
   identifying at least one property of a user-interface control that will be invoked by following the recorded path during the quality-assurance review;
   determining whether the identified property matches the property identified in the data structure.

18. The method of claim 13, wherein the data structure comprises a database file in a database.

19. A system for reliably identifying controls invoked during quality-assurance reviews of user interfaces, the system comprising:
   a control-identification module, a path-identification module, and a storage module programmed to automatically record at least one user-interface control invoked by a quality-assurance engineer during an initial quality-assurance review of a user interface by:
      identifying an object tree associated with the user interface that identifies relationships between control layers and control objects within the user interface;
      recording, in a data structure, a path through the user interface's object tree that was followed when the user-interface control was invoked by the quality-assurance engineer;
   a control-invoking module programmed to automatically play back, during a subsequent quality-assurance review of the user interface, the user-interface control that was invoked by the quality-assurance engineer during the initial quality-assurance review by:
      retrieving the recorded path from the data structure;
      following the recorded path through the user interface's object tree to identify and invoke the user-interface control;
   at least one processor programmed to execute the control-identification module, the path-identification module, the storage module, and the control-invoking module.

* * * * *